March 30, 1943. P. C. A. WHITECHURCH 2,315,030
HINGED CONNECTION, MORE PARTICULARLY FOR
BINOCULAR OPTICAL INSTRUMENTS
Filed Jan. 16, 1941
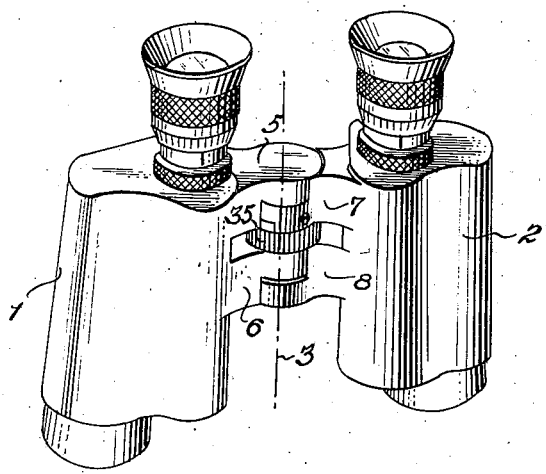
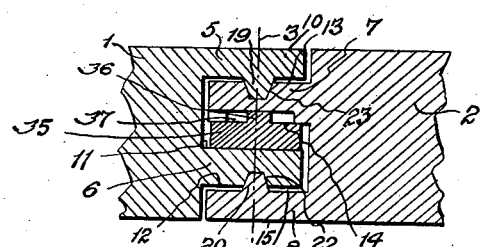
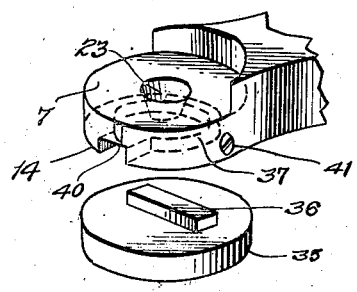
INVENTOR,
P. C. A. Whitechurch
BY
Glascock Downing + Seebold
ATTORNEYS Patented Mar. 30, 1943

2,315,030

UNITED STATES PATENT OFFICE 2,315,030

HINGED CONNECTION, MORE PARTICULARLY FOR BINOCULAR OPTICAL INSTRUMENTS

Philip Charles Antoine Whitechurch, Neuilly-sur-Seine, France; vested in the Alien Property Custodian Application January 16, 1941, Serial No. 374,742
In France January 23, 1940

3 Claims. (Cl. 88—34)

My invention relates to a hinged connection of two pieces capable of being turned one with reference to the other about an axis along an angle less than to a circumference.

An object of my invention is to provide a hinged connection liable to receive numerous applications and which is particularly applicable to binocular optical instruments in which the pupillary distance between the lenses is varied by rotating a body with reference to the other about an axis parallel with the optical axis.

A further object of my invention is to provide a hinged connection of simple and effective construction, the fitting and the taking to pieces of which may be realized in a very easy way.

A still further object of my invention is to provide a binocular optical apparatus construction with an improved hinged connection which may be easily combined with a mechanism for moving the eye pieces to obtain focal adjustments.

With these and other objects in view, my invention consists of the constructions and the arrangements of parts which will be described in reference to the accompanying drawing given solely by way of example and in which:

Fig. 1 is a perspective view of a prism binocular telescope constructed according to my invention, Fig. 2 is a diagrammatic cross-section of the hinged connection by a plane containing its pivotal axis;

Fig. 3 is an enlarged perspective view of a detail of Fig. 2. Referring more specifically to the embodiment illustrated the two bodies 1 and 2 of a binocular prism telescope or field glass have a hinged connection providing for their relative rotation about the median axis 3 substantially parallel with the optical axis, to permit of adjusting the pupillary distance between the eye pieces. The said hinged connection is obtained by two pairs of arms 5—6 and 7—8 rigid with the bodies 1 and 2 and perpendicular with the axis 3.

The two arms of each pair are spaced in a direction parallel with the axis 3 and are arranged opposite one another.

The arms end by a rounded free part co-axial with the pivotal axis 3. The said free parts are each limited by two plane faces perpendicular to the axis 3 and designated (Fig. 2) by the reference numerals 9 and 10 for the arm 5, 11 and 12 for the arm 6, 13 and 14 for the arm 7, 15 and 16 for the arm 8. The distance between the two inner opposite faces 9 and 11 provided on the arms 5 and 8 is substantially equal to the distance between the two inner opposite faces 14 and 16 provided on the arms 7 and 8.

The arms 5 and 8 present at the surface 9 and 16 respectively an advantageously frusto conical projection 19 and 20 coaxial with the axis 3 and of a height inferior to the half of the aforesaid distance. Similarly the arms 6 and 7 present on the surfaces 12 and 13 recesses 22 and 23 coaxial with the axis 3, arranged and shaped like the projections 19 and 20 with which they are adapted to cooperate.

The said projections and recesses may be provided into pieces secured to the respective arms for example by means of pressing, threading, or may be in one with said arms (which are each in one or several pieces).

The hinged connection is performed by the engagement of the projections 19 and 20 into the recesses 22 and 23 the two pairs of arms fitting into one another.

The hinged connection is maintained in assembled position by means of a wedge 35 fixed in the space remained free between the faces 11 and 14 and having dimensions corresponding to that space. Said wedge 35 may be maintained in place in any appropriate way such as for instance by fitting, or by means of a pin. In the example shown and as illustrated in Fig. 3 on an enlarged scale, the wedge 35 is maintained in position by the aid of a projecting peg 36 penetrating into a circular hollow provided in the surface 14. A radial indentation 40 of a width equal to that of the tenant 36 causes this hollow 37 to communicate with the exterior. A screw 41 is foreseen to fix the wedge 35.

It is evident that the connection enables the swinging round the axis 3 of the body 1 with regard to the body 2.

After the removal of the wedge 35 which is easily secured by the indentation 40 through which the peg 36 may be slided, the taking to pieces of the whole may be realized by a simple relative displacing parallelly to the axis 3.

The fitting up is realised in the same manner, the wedge 35 being introduced into its lodging after the assemblage is mounted and being maintained by the aid of the screw 41. The shape of the cavity 37 is such as to enable this wedge to be revolved on itself before the tightening of the screw 41 to displace the peg 36 with regard to the indentation 40 serving for its introduction.

The arms, or by preference the wedge 35 may have rings or bridles for fixing the field glass or for its suspension on a belt or analogous support.

Obviously the maintaining in position, in particular of the wedge 35 may be realized in any other convenient manner.

A cylindrical, conical or other opening coaxial with axis 3, may be provided in the pieces of the connection (arms and wedge) to lodge any mechanism for focal adjustment.

While I have described what I at present consider as preferred embodiments of my invention, it is obvious that I do not desire to be limited thereto and that various modifications may be made without departing from the principle and scope of my invention.

What I claim is:

1. A hinged connection between two pieces and more particularly between the two casings of a binocular telescope including two pairs of arms, one of said pairs being carried by one of said pieces and the other pair by the other piece, the two arms of each pair being arranged opposite each other and spaced in a direction parallel with the pivotal axis of the connection, a projection part rigid with one arm of each pair and projecting inside the space formed between the arms of the pair from the surface of said last named arm facing the other arm of the pair, a recess provided in the other arm of each pair in the surface of the arm opposite the surface of the same arm limiting the space between the two arms of the pair, the said projections and recesses being laterally limited by similar surfaces of revolution about the pivotal axis of the connection, the projection and recess of one pair of arms being shaped like the recess and projection of the other pair of arms and being removably engaged in each other and means for axially maintaining the pairs in the engaged position.

2. A hinged connection between two pieces and more particularly between the two casings of a binocular telescope including two pairs of arms, one of said pairs being carried by one of said pieces and the other pair by the other piece, the two arms of each pair being arranged opposite each other and spaced in a direction parallel with the pivotal axis of the connection, a projection part rigid with one arm of each pair and projecting inside the space formed between the arms of the pair from the surface of said last named arm facing the other arm of the pair, a recess provided in the other arm of each pair in the surface of the arm opposite the surface of the same arm limiting the space between the two arms of the pair, the said projections and recesses being laterally limited by similar surfaces of revolution about the pivotal axis of the connection, the projection and recess of one pair of arms being shaped like the recess and projection of the other pair of arms and being removably engaged in each other, a wedge engaged in the space remained free between the two pairs of arms and means for fixing said wedge on one of the adjacent arms.

3. A hinged connection as claimed in claim 2 in which said means include a peg projecting from said wedge and engaging a hollow provided in the contacting surface of the adjacent arm.

PHILIP CHARLES ANTOINE WHITECHURCH.